United States Patent
Fuhrer

(10) Patent No.: US 11,349,230 B2
(45) Date of Patent: May 31, 2022

(54) CHARGING CABLE FOR TRANSMITTING ELECTRIC ENERGY, CHARGING PLUG AND CHARGING STATION FOR DISCHARGING ELECTRIC ENERGY TO A RECIPIENT OF ELECTRIC ENERGY

(71) Applicant: PHOENIX CONTACT E-MOBILITY GMBH, Schieder-Schwalenberg (DE)

(72) Inventor: Thomas Fuhrer, Blomberg (DE)

(73) Assignee: PHOENIX CONTACT E-Mobility GmbH, Schieder-Schwalenberg (DE)

( * ) Notice: Subject to any disclaimer, the term of this patent is extended or adjusted under 35 U.S.C. 154(b) by 655 days.

(21) Appl. No.: 16/303,925

(22) PCT Filed: May 16, 2017

(86) PCT No.: PCT/EP2017/061716
§ 371 (c)(1),
(2) Date: Nov. 21, 2018

(87) PCT Pub. No.: WO2017/207266
PCT Pub. Date: Dec. 7, 2017

(65) Prior Publication Data
US 2020/0317070 A1   Oct. 8, 2020

(30) Foreign Application Priority Data

Jun. 1, 2016   (DE) ..................... 10 2016 209 607.9

(51) Int. Cl.
*H01R 9/05*   (2006.01)
*B60L 53/18*   (2019.01)
(Continued)

(52) U.S. Cl.
CPC ............... *H01R 9/05* (2013.01); *B60L 53/16* (2019.02); *B60L 53/18* (2019.02); *H01B 9/006* (2013.01); *H01B 9/02* (2013.01); *H01B 7/425* (2013.01)

(58) Field of Classification Search
CPC .. H01B 7/42; H01B 9/006; H01B 9/02; B60L 11/1818; B60L 53/16; B60L 53/18
(Continued)

(56) References Cited

U.S. PATENT DOCUMENTS 5,909,099 A * 6/1999 Watanabe ............... B60L 53/34
320/108
8,847,069 B2 * 9/2014 Emme .................... H01B 7/423
174/15.6
(Continued)

FOREIGN PATENT DOCUMENTS

CN    202855346 U    4/2013
CN    103262177 A    8/2013
(Continued)

OTHER PUBLICATIONS

Chinese Office Action dated May 26, 2020 in CN Application No. 201780033945.5.
(Continued)

*Primary Examiner* — William H. Mayo, III
(74) *Attorney, Agent, or Firm* — Occhiuti & Rohlicek LLP

(57) ABSTRACT

A charging cable for transmitting electric energy has a non-metallic sheathed cable and includes at least four electric conductor cables (a1, a2, b1, b2, pe) provided in the non-metallic sheathed cable. A first electric conductor cable and a second electric conductor cable are both assigned to a
(Continued)

Figure 1:
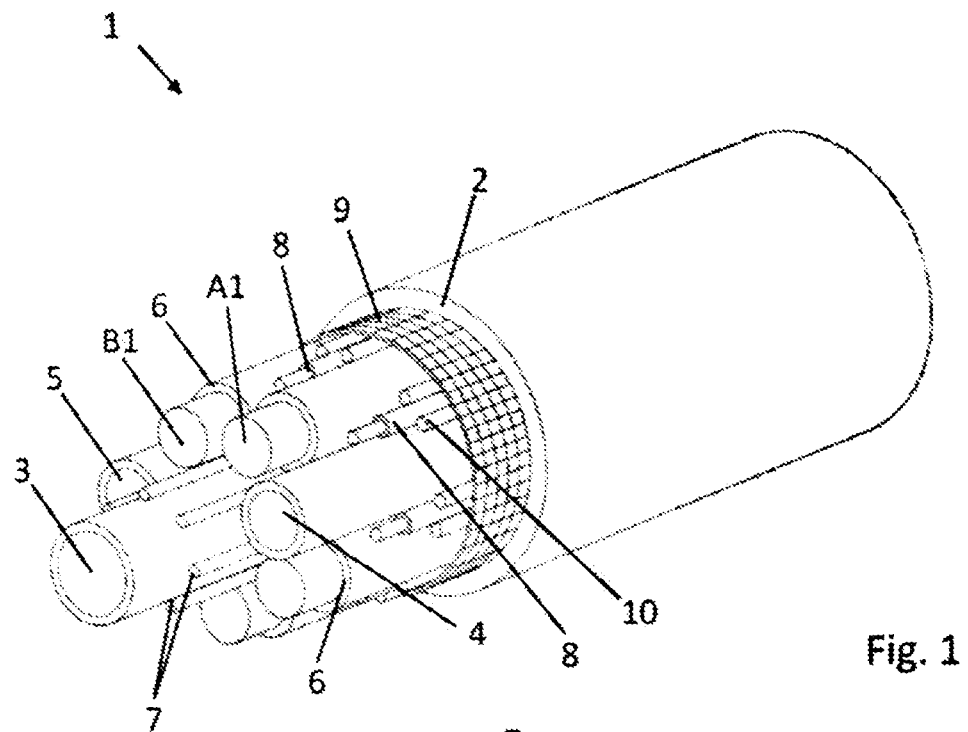

first voltage potential. A third electric conductor cable and a fourth electric conductor cable are both assigned to a second voltage potential.

18 Claims, 1 Drawing Sheet

(51) Int. Cl.
   *B60L 53/16* (2019.01)
   *H01B 9/00* (2006.01)
   *H01B 9/02* (2006.01)
   *H01B 7/42* (2006.01)

(58) Field of Classification Search
   USPC ............................... 320/107; 174/113 R, 116
   See application file for complete search history.

(56) References Cited

U.S. PATENT DOCUMENTS

| | | | | |
|---|---|---|---|---|
| 10,029,575 | B2* | 7/2018 | Remisch | B60L 53/302 |
| 2001/0002773 | A1* | 6/2001 | Hyogo | H01B 9/003 |
| | | | | 307/147 |
| 2009/0178825 | A1* | 7/2009 | Wu | H01B 7/425 |
| | | | | 174/113 R |
| 2012/0043935 | A1* | 2/2012 | Dyer | B60L 53/305 |
| | | | | 320/109 |
| 2013/0269966 | A1* | 10/2013 | Emme | H01B 7/423 |
| | | | | 174/15.6 |
| 2015/0002773 | A1 | 1/2015 | Ogawa et al. | |
| 2015/0041171 | A1 | 2/2015 | Heggdal | |
| 2015/0107874 | A1 | 4/2015 | Green et al. | |
| 2015/0217654 | A1* | 8/2015 | Woo | B60L 53/11 |
| | | | | 320/109 |
| 2015/0243411 | A1 | 8/2015 | Maeda | |

FOREIGN PATENT DOCUMENTS

| | | | | |
|---|---|---|---|---|
| CN | 205158923 U | 4/2016 | | |
| CN | 105575559 A | 5/2016 | | |
| DE | 35 28 585 | 2/1987 | | |
| DE | 3528585 A1 * | 2/1987 | ............... | H01B 7/00 |
| DE | 93 19 131 | 7/1994 | | |
| DE | 20 2007 012165 | 11/2007 | | |
| DE | 10 2010 033441 | 2/2012 | | |
| DE | 20 2014 000328 | 6/2015 | | |
| DE | 102015114133 A1 * | 8/2015 | ............... | H01B 7/42 |
| DE | 10 2015 114133 | 3/2017 | | |
| EP | 2 874 156 | 5/2015 | | |
| FR | 1 164 751 | 10/1958 | | |
| JP | S60-226713 A | 11/1985 | | |
| JP | S63-114383 A | 7/1988 | | |
| JP | 2005-339928 A | 12/2005 | | |
| JP | 2014-216066 A | 11/2014 | | |
| WO | 2010/142917 | 12/2010 | | |
| WO | 2015/060294 | 4/2015 | | |

OTHER PUBLICATIONS

Anonymous: "Leitungsquerschnitt paralleler Adern—Mikrocontroller. net"; URL:https://www.mikrocontroller.net/topic/71868 (Jun. 21, 2007) (Retrieved Jul. 18, 2017).
European Office Action dated May 14, 2020 in EP Application No. 17724793.9.
Japanese Office Action dated Nov. 25, 2020 in JP Application No. 2018-562991.

* cited by examiner

CHARGING CABLE FOR TRANSMITTING ELECTRIC ENERGY, CHARGING PLUG AND CHARGING STATION FOR DISCHARGING ELECTRIC ENERGY TO A RECIPIENT OF ELECTRIC ENERGY

CROSS-REFERENCE TO RELATED APPLICATIONS

This application is a US National Stage of International Application No. PCT/EP2017/061716, filed on May 16, 2017, which claims the priority date of German Application No. 10 2016 209 607.9, filed on Jun. 1, 2016.

The present invention relates to a charging cable for transmitting electrical energy, which is used, in particular, for transmitting electrical energy in the charging of an electric vehicle. In addition, the present invention relates to a charging plug for coupling to a corresponding connection device and for transmitting electrical energy. Furthermore, the present invention relates to a charging station for delivering electrical energy to a recipient of electrical energy.

There are known from the prior art charging cables, for transmitting electrical energy, which have two conductor cables that are each assigned to different voltage potentials and that are surrounded by a sheath. When electric currents are transmitted via the conductor cables, the latter heat up, owing to ohmic losses within the conductor cables. Upon heating-up of the conductor cables, in turn, the ohmic resistance of the conductor cables increases, such that the heating of the conductor cables then proceeds in an accelerated manner.

In the case of charging cables known from the prior art, a transmission of heat from the conductor cable to the further structures present in the charging cable is not very efficient.

In order to reduce the generated heat, the ohmic resistance of the conductor cable must be reduced. For this purpose, it is known to increase the conductor cross sections of conductor cables. This approach is limited for handling reasons, however, since a corresponding charging cable, by which charging currents of 350 A can be transmitted at voltages of up to 1000 V, would be so large and heavy that operation of a charging plug having a corresponding charging cable leading into it is possible only with difficulty, since a corresponding charging cable would be of a heavy weight.

Owing to a charging current flowing through the charging cables, the charging cables heat inevitably heat up as a result of ohmic current heat losses. The heating of the charging cables, however, is limited to a limiting temperature increase. Thus, for example, according to the IEC 62196-3 standard, the limiting temperature increase is limited to 50K.

In the case of an intermittent charging of an accumulator, on the other hand, higher charging currents, of 350 A and more, are necessary over limited time periods in order to charge the accumulator in a required short time. This in turn results in a temporary heating of the charging cables that is above the limiting temperature increase. As already mentioned above, the conductor cross section of the charging cables cannot be increased optionally, since this would make it difficult to handle the charging plug connected to the charging cable.

The present invention is based on the object of providing a charging cable that renders possible increased charging currents with a limited heating, thus consequently an increased current carrying capacity.

This object is achieved by a charging cable having the features of claim 1. Advantageous embodiments are described in the claims dependent on claim 1.

In addition, the present invention is based on the object of providing a charging plug by means of which increased charging currents can be transmitted without excessive heating of the charging plug.

This object is achieved by a charging plug having the features of claim 13.

Finally, the present invention is also based on the object of providing a charging station for delivering electrical energy to a recipient of electrical energy, by means of which increased peak charging currents can be transmitted. This object is achieved by a charging station having the features of claim 14.

More precisely, the object on which the present invention is based is achieved by a charging cable for transmitting electrical energy, having a sheath, which charging cable is characterized in that, arranged within the sheath there are at least four conductor cables, wherein a first conductor cable and a second conductor cable are jointly assigned to a first electric potential, and a third conductor cable and a fourth conductor cable are jointly assigned to a second electric potential.

The sheath may alternatively also be referred to as a cable sheath.

As a result of four conductor cables being provided, with two conductor cables in each case being assigned to a common electric potential, the surface of the conductor pairs, which are each assigned to an electric potential, is increased. In this case, the first conductor cable and the second conductor cable form a first conductor pair, which is assigned to a common electric potential, for example to the plus pole in the case of a charging cable realized as a d.c. voltage charging cable. The third conductor cable and the fourth conductor cable form a second conductor pair, which is assigned to a common electric potential, for example to the minus pole in the case of a charging cable realized as a d.c. voltage charging cable. Owing to the enlargement of the surface of the current-carrying cable, there is improved transmission of the heat, generated in the conductor cables as a result of ohmic losses, to the rest of the charging cable. Consequently, the charging cables have a lower temperature, such that the conductor cables can be used to transmit greater charging currents without the conductor cables and the charging cables themselves undergoing excessive heating. Consequently, by means of the charging cable according to the invention, it is possible to transmit increased charging currents without increasing the conductor cross sections of the conductor cables. Therefore, although greater charging currents can be transmitted by means of the charging cables, the handleability of the charging cable and, for example, of a charging plug coupled to the charging cable, is not impaired. Furthermore, excessive heating of the conductor cables is prevented.

Preferably, the first conductor cable and the second conductor cable are directly electrically connected to each other. This direct electrical connection may preferably be realized at the ends of the charging cable. In addition, preferably, the third conductor cable and the fourth conductor cable are directly electrically connected to each other. Furthermore, preferably, the conductor cables have a circular cross section. Furthermore, preferably, the diameters of the conductor cables are identical.

Preferably, the conductor cables are each surrounded by an insulating sheath. The charging cable is designed, in particular, for coupling to a charging plug for charging an electric vehicle.

According to an advantageous design of the charging cable, a metal layer, for example in the form of a metal foil or a metal-lined plastic film, is provided on an inner circumferential surface of the sheath. Furthermore, preferably, the metal layer/metal foil/metal-lined plastic film is in direct contact with the inner circumferential surface of the sheath.

The correspondingly realized charging cable has a more homogeneous heat distribution, in particular on an outer surface of the charging cable.

The charging cable is preferably realized in such a manner that a fifth conductor cable, which is realized as a protective conductor cable, is arranged within the sheath.

Furthermore, preferably, the charging cable is realized in such a manner that the fifth conductor cable is arranged between the second conductor cable and the fourth conductor cable, or between the first conductor cable and the third conductor cable.

In this case, the fifth conductor cable, i.e. the protective conductor cable, is preferably in direct contact with the second conductor cable and the fourth conductor cable, or with the first conductor cable and the third conductor cable. A corresponding design of the charging cable enables heat, generated in the first to fourth conductor cables, to be transmitted to the protective conductor cable, such that the heat is distributed in an improved manner within the charging cable, as a result of which the temperatures of the first to fourth conductor cables is reduced. Increased charging currents can therefore be transmitted by means of the first to fourth conductor cables without the conductor cables and the charging cable themselves undergoing excessive heating.

According to an advantageous design, the charging cable is realized in such a manner that the charging cable has at least one cooling line, which is arranged within the sheath and through which a cooling fluid can flow.

Owing to the arrangement of a cooling line, through which a cooling fluid can flow, there is further improved cooling of the charging cable. The heat generated in the conductor cables as a result of ohmic losses is transmitted to the cooling line, and thus to the cooling fluid flowing through the cooling line, such that the temperature of the entire charging cable, and in particular the temperature of the conductor cables, is reduced in a particularly effective manner. Even greater charging currents can therefore be transmitted by means of a correspondingly realized charging cable, without the necessity of increasing the cross sections of the conductor cables. The handleability of the charging cable, and of a charging plug connected to the charging cable, is thereby maintained.

Clearly, two and more cooling lines, all arranged within the sheath, may also be arranged with the charging cable.

Water, for example, may be used as a cooling fluid. In addition, ketones, in particular fluorinated ketones, may be used as a cooling fluid. Ketones have the advantage that they are not electrically conductive.

The cooling line, which is also referred to as a central cooling line, preferably has a greater diameter than the respective conductor cables.

Preferably, the charging cable is realized in such a manner that the cooling line is in direct contact with each conductor cable.

A corresponding realization of the charging cable enables a particularly effective cooling to be achieved.

Furthermore, preferably, the cooling line is in indirect contact with each conductor cable by means of at least one strain relief cable arranged between the cooling line and the respective conductor cable.

As a result of the strain relief cables being provided between the conductor cables and the cooling line, the conductor cables, in addition to being in possibly direct contact, are also in indirect contact with the cooling line via the respective strain relief cables, such that there is a further improved transfer of the heat in the conductor cables to the cooling line. The strain relief cables in this case are preferably realized as aramid fiber cables.

Furthermore, preferably, the charging cable is realized in such a manner that the cooling line is arranged centrally, as a central cooling line, within the sheath, the central cooling line being surrounding in a stellate manner by all conductor cables in the cross section of the charging cable, and the central cooling line being in direct contact with each conductor cable.

If the charging cable is realized accordingly, the heat generated in the conductor cables can be transmitted in a further improved manner to the cooling line, such that increased charging currents can be transmitted by means of the correspondingly realized charging cable.

Advantageously, the charging cable in this case is realized in such a manner that the charging cable has, in addition to the central cooling line, a second cooling line and a third cooling line, through each of which a cooling fluid can flow, the second cooling line and the third cooling line being arranged in a stellate manner around the central cooling line in the cross section of the charging cable.

By the provision of further cooling lines in the charging cable, cooling of the latter can be improved. In particular, as a result of the stellate arrangement of the second cooling line and third cooling line around the central cooling line, the conductor cables are better able to dissipate heat to the cooling lines, owing to the increased contact area.

Preferably, the second cooling line and the third cooling line each have a circular cross section. Furthermore, preferably, the second cooling line and the third cooling line have a diameter that is the same as that of the conductor cables.

Furthermore, preferably, the charging cable is realized in such a manner that the cooling line is in direct contact with the second cooling line and the third cooling line, and the central cooling line additionally being in indirect contact with the second cooling line and the third cooling line by means of at least strain relief cable being arranged, respectively, between the central cooling line and the second cooling line and between the central cooling line and the third cooling line.

According to a further advantageous design, the charging cable is realized in such a manner that the second cooling line is arranged between the first conductor cable and the second conductor cable, or between the second conductor cable and the fifth conductor cable is in direct contact with them in each case, the third cooling line being arranged between the third conductor cable and the fourth conductor cable, or between the fourth conductor cable and the fifth conductor cable, and being in direct contact with them in each case.

A corresponding realization of the charging cable renders possible a further improved transfer of heat from the conductor cables to the cooling lines, such that the conductor cables have a reduced temperature, as a result of which increased charging currents can be transmitted by means of the conductor cables.

Advantageously, the charging cable is realized in such a manner that, in the cross section of the charging cable, the conductor cables, the second cooling line and the third cooling line are arranged at equidistant angular intervals around the central cooling line, and are each in direct contact with the central cooling line.

Owing to the symmetrical structure of the correspondingly realized charging cable, the latter provides an improved transfer of heat from the conductor cables to the remaining structures and the remaining component parts of the charging cable, such that these has a more uniform temperature.

Furthermore, preferably, the charging cable is realized in such a manner that, arranged between two conductor cables that are directly adjacent to each other and in direct contact with each other, there is a signal line, which is likewise in direct contact with the conductor cables that are in direct contact with each other.

Owing to the direct contact of a conductor cable with a signal line, also, heat is transferred from the conductor cable to the signal cable, as a result of which the temperature of the conductor cables is reduced.

According to a further advantageous design, the charging cable is realized in such a manner that, arranged between a conductor cable and the second cooling line or the third cooling line, which is in direct contact with the conductor cable, there is at least one signal line, which is in direct contact with the conductor cable and with the second cooling line or the third cooling line.

Consequently, the conductor cables, via the direct contact with the cooling lines, are additionally indirectly in contact with the latter via the signal line, such that the heat generated in the conductor cables can be transmitted in an improved manner to the cooling lines, as a result of which the temperature of the conductor cables can be reduced yet more effectively.

Preferably, the conductor cables and/or the cooling lines and/or the strain relief cable are arranged in a stellate manner around the central cooling line.

The object on which the present invention is based is also achieved by a charging plug, for coupling to a corresponding connection device and for transmitting electrical energy, which is characterized in that the charging plug has at least two power contacts, which are arranged in a charging-plug housing and which are accessible via a contact side of the charging-plug housing, a first power contact being directly electrically contacted to the first conductor cable and the second conductor cable, and a second power contact being directly electrically connected to the third conductor cable and the fourth conductor cable.

In addition, the object on which the present invention is based is achieved by a charging station for delivering electrical energy to a recipient having a charging plug described above.

Figure 2:
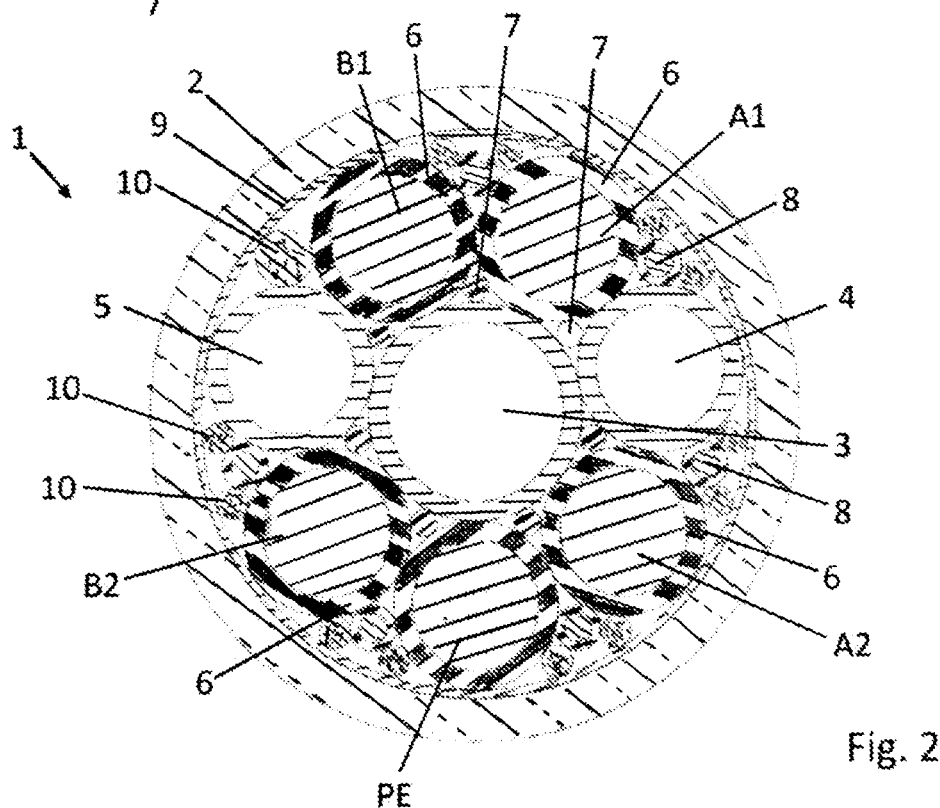

Further advantages, details and features of the invention are revealed in the following by the explained exemplary embodiments. There are shown in detail:

FIG. 1: a perspective representation of a charging cable according to the invention, of the present invention; and FIG. 2: a sectional representation of the charging cable represented in FIG. 1.

In the description that now follows, component parts that are the same, or features that are the same, are denoted by the same references, such that a description relating to a structural part that is given in relation to one figure also applies to the other figures, such that a repeated description is avoided. In addition, individual features that have been described in connection with one embodiment are also separately applicable in other embodiments.

Represented in FIGS. 1 and 2 is a charging cable 1 according to the invention, the charging cable 1 being shown in a perspective representation in FIG. 1 and in a sectional representation in FIG. 2.

The charging cable 1 for transmitting electrical energy has a sheath 2, which surrounds all components of the charging cable 1. Adjoining a circumferential inner surface of the sheath 2 is a metal foil 9, which may also be realized, for example, in the form of a metal foil or a metal-lined plastic film. The metal foil 9 therefore also surrounds all components (apart from the sheath 2) of the charging cable 1. The charging cable 1 additionally has five conductor cables, namely a first conductor cable A1, a second conductor cable A2, a third conductor cable B1 and a fourth conductor cable B2, which, in the exemplary embodiment represented, are designed to transmit direct current, and a fifth conductor cable PE, realized as a protective conductor PE. All conductor cables A1, A2, B1, B2, PE are each respectively surrounded by an insulating sheath 6, such that the conductor cables A1, A2, B1, B2, PE are not in electrical contact with their surroundings.

A first conductor pair, composed of the first conductor cable A1 and the second conductor cable A2, is in this case assigned to a common, first electric potential. The first conductor pair may be assigned, for example, to the plus pole in the case of a charging cable 1 realized as a d.c. voltage charging cable 1. A second conductor pair, composed of the third conductor cable B1 and the fourth conductor cable B2, is assigned to a common, second electric potential. The second conductor pair may be assigned, for example, to the minus pole in the case of a charging cable 1 realized as a d.c. voltage charging cable 1. Owing to the enlargement of the surface, more precisely of the circumferential surfaces of the conductor cables A1, A2, B1, B2, the heat generated in the conductor cables as a result of ohmic losses is transmitted in an improved manner to the rest of the charging cable 1. Consequently, the conductor cables A1, A2, B1, B2 have a lower temperature, such that greater charging currents can be transmitted by means of the conductor cables A1, A2, B1, B2 without the conductor cables A1, A2, B1, B2 and the charging cable 1 themselves undergoing excessive heating.

The protective conductor PE is arranged between the second conductor cable A2 and the fourth conductor cable B2. Alternatively, the protective conductor PE may also be arranged between the first conductor cable A1 and the third conductor cable B1.

It can be seen from FIGS. 1 and 2 that the charging cable 1 additionally has three cooling lines 3, 4, 5, which are arranged within the sheath 2, and in each of which a fluid channel is formed, such that a cooling fluid can flow through the cooling lines 3, 4, 5. In this case, the first cooling line 3 is realized as a central cooling line 3. The central cooling line 3 is in direct contact with each of the conductor cables A1, A2, B1, B2, PE. The second cooling line 4 is in direct contact both with the central cooling line 3 and with the first conductor cable A1 and the second conductor cable A2. The third cooling line 5 is in direct contact both with the central cooling line 3 and with the third conductor cable B1 and the fourth conductor cable B2. Owing to the direct contact of the conductor cables A1, A2, B1, B2, PE with the cooling lines 3, 4, 5, the heat generated in the conductor cables A1, A2, B1, B2, PE is thus removed in an effective manner by means of a cooling fluid flow within the cooling lines 3, 4, 5.

It can also be seen from the figures that the central cooling line 3 is in indirect contact with each of the conductor cables A1, A2, B1, B2, PE by means of at least one strain relief cable 7 arranged between the central cooling line 3 and the respective conductor cable A1, A2, B1, B2, PE. The respective strain relief cables 7 may be realized, for example, as aramid fiber cables 7. As a result of the strain relief cables 7 being arranged between the conductor cables A1, A2, B1, B2, PE and the central cooling line 3, the conductor cables A1, A2, B1, B2, PE, in addition to the direct contact, are also indirectly in contact with the central cooling line 3 via the respective strain relief cables 7, such that the heat in the conductor cables A1, A2, B1, B2, PE can be transmitted in a further improved manner to the central cooling line 3.

It can also be seen from the figures that the central cooling line 3 is arranged centrally within the sheath 2, and the central cooling line 3 is surrounded in a stellate manner by all conductor cables A1, A2, B1, B2, PE, and by the second cooling line 4 and the third cooling line 5, in the cross section of the charging cable 1. Thus, in the cross section of the charging cable 1, the conductor cables A1, A2, B1, B2, PE, the second cooling line 4 and the third cooling line 5 are arranged at equidistant angular intervals around the central cooling line 3, and are each in direct contact with the central cooling line 3.

The charging cable 1 according to the invention additionally comprises a plurality of signal lines 8, which are arranged between respectively two conductor cables A1, A2, B1, B2, PE that are directly adjacent to each other and in direct contact with each other. The signal lines 8 in this case are likewise in direct contact with the conductor cables A1, A2, B1, B2, PE E.

In addition, some of the signal lines 8 are arranged between a conductor cable A1, A2, B1, B2, PE and the second cooling line 4 or the third cooling line 5, which are in direct contact with that conductor cable A1, A2, B1, B2, PE, and are in direct contact with the respective conductor cable A1, A2, B1, B2, PE and the second cooling line 4 or the third cooling line 5.

The charging cable 1 according to the invention additionally has a plurality of filler strands 10, which are also referred to as filler cables 10. The filler strands 10 may be formed from a fiber material, for example from a cotton fiber fabric.

LIST OF REFERENCES 1 charging cable
2 sheath/cable sheath
3 (first) cooling line/central cooling line
4 second cooling line
5 third cooling line
6 insulating sheath (of the respective conductor cable)
7 strain relief cable/aramid fiber cable
8 signal line
9 metal foil
10 filler cable
A1 first conductor cable
A2 second conductor cable
B1 third conductor cable
B2 fourth conductor cable
PE protective conductor/fifth conductor cable

The invention claimed is:

1. A charging cable for transmitting electrical energy, having a sheath, which comprises the following features:
 arranged within the sheath there are at least four conductor cables (A1, A2, B1, B2, P3);
 a first conductor cable and a second conductor cable are jointly assigned to a first electric potential;
 a third conductor cable and a fourth conductor cable are jointly assigned to a second electric potential, and
 at least one cooling line, which is arranged within the sheath and through which a cooling fluid can flow, wherein the cooling line is in indirect contact with each conductor cable (A1, A2, B1 B2, PE) by means of at least one strain relief cable arranged between the cooling line and the respective conductor cable (A1, A2, B1, B2, PE).

2. The charging cable as claimed in claim 1, wherein there is a metal foil arranged on an inner circumferential surface of the sheath.

3. The charging cable as claimed in claim 2, wherein there is additionally a fifth conductor cable (PE), which is realized as a protective conductor cable (PE), arranged within the sheath.

4. The charging cable as claimed in claim 2 wherein the charging cable has at least one cooling line, which is arranged within the sheath and through which a cooling fluid can flow.

5. The charging cable as claimed in claim 1, wherein there is additionally a fifth conductor cable (PE), which is realized as a protective conductor cable (PE), arranged within the sheath.

6. The charging cable as claimed in claim 5, wherein the fifth conductor cable (PE) is arranged between the second conductor cable (A2) and the fourth conductor cable (B2), or between the first conductor cable (A1) and the third conductor cable (B1).

7. The charging cable as claimed in claim 5 wherein the charging cable has at least one cooling line, which is arranged within the sheath and through which a cooling fluid can flow.

8. The charging cable as claimed in claim 1, wherein the cooling line is in direct contact with each conductor (A1, A2, B1, B2, PE).

9. The charging cable as claimed in claim 1, which comprises the following features:
 the cooling line is arranged centrally, as a central cooling line, within the sheath:
 the central cooling line surrounding in a stellate manner by all conductor cables (A1, A2, B1, B2, PE) in the cross section of the charging cable; and
 the central cooling line is in direct contact with each conductor cable (A1, A2, B1, B2, PE).

10. The charging cable as claimed in claim 9, which comprises the following features:
 the charging cable has, in addition to the central cooling line, a second cooling line and a third cooling line, through each of which a cooling fluid can flow;
 in the cross section of the charging cable the second cooling line and the third cooling line are arranged in a stellate manner around the central cooling line.

11. The charging cable as claimed in claim 10, which comprises the following features:
 the central cooling line is in direct contact with the second cooling line and the third cooling line; and
 the central cooling line is additionally in indirect contact with the second cooling line and the third cooling line by means of at least respectively one strain relief cable arranged between the central cooling line and the second cooling line and between the central cooling line and the third cooling line.

12. The charging cable as claimed in claim 10, which comprises the following features:
 the second cooling line is arranged between the first conductor cable (A1) and the second conductor cable (A2), or between the second conductor cable (A2) and the fifth conductor cable (PE), and is in direct contact with them in each case; and
 the third cooling line is arranged between the third conductor cable (B1) and the fourth conductor cable (B2), or between the fourth conductor cable (B2) and the fifth conductor cable (PE), and is in direct contact with them in each case.

13. The charging cable as claimed in claim 10, wherein, in the cross section of the charging cable, the conductor cables (A1, A2, B1, B2, PE), the second cooling line and the third cooling line are arranged at equidistant angular intervals around the central cooling line, and are each in direct contact with the central cooling line.

14. The charging cable as claimed in claim 10, wherein, arranged between a conductor cable (A1, A2, B1, B2, PE) and the second cooling line or the third cooling line, which is in direct contact with the conductor cable (A1, A2, B1, B2, PE), there is at least one signal line, which is in direct contact with the conductor cable (A1, A2, B1, B2, PE) and with the second cooling line or the third cooling line.

15. The charging cable as claimed in claim 1, wherein, arranged between two conductor cables (A1, A2, B1, B2, PE) that are directly adjacent to each other and in direct contact with each other, there is a signal line, which is likewise in direct contact with the conductor cables (A1, A2, B1, B2, PE) that are in direct contact with each other.

16. A charging plug, for coupling to a corresponding connection device and for transmitting electrical energy, which comprises the following features:
    the charging plug has at least two power contacts, which are arranged in a charging-plug housing and which are accessible via a contact side of the charging-plug housing;
    a first power contact being is directly electrically contacted to the first conductor cable (A1) and the second conductor cable (A2) of a charging cable as claimed in claim 1; and
    a second power contact is directly electrically connected to the third conductor cable (B1) and the fourth conductor cable (B2) of the charging cable.

17. A charging station for delivering electrical energy to a recipient of electrical energy, wherein the charging station has a charging plug as claimed in claim 16.

18. The charging cable as claimed in claim 1, wherein the cooling line is in indirect contact with each conductor cable (A1, A2, B1, B2, PE) by means of at least one strain relief cable arranged between the cooling line and the respectively conductor cable (A1, A2, B1, B2, PE).

* * * * *